June 28, 1927.
G. G. GRACE
BELT CONNECTER
Filed Oct. 26, 1925
1,633,939
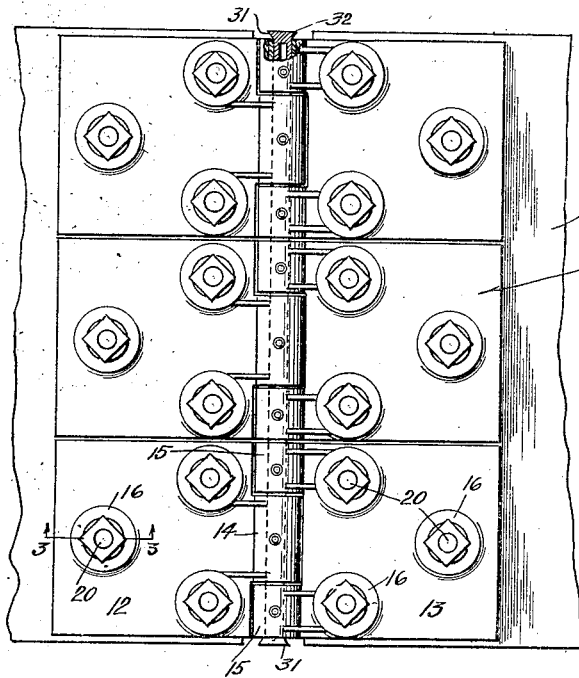
Fig. 1.
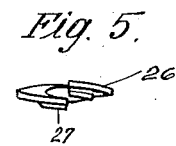
Fig. 5.
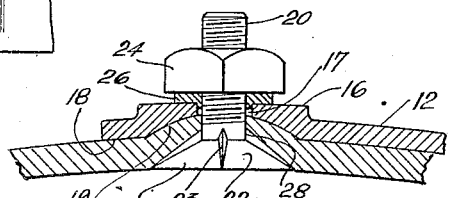
Fig. 3.
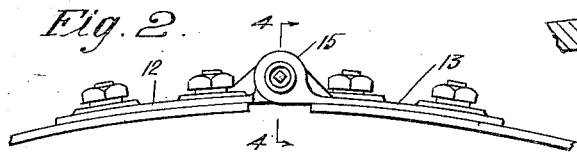
Fig. 2.
Fig. 6.
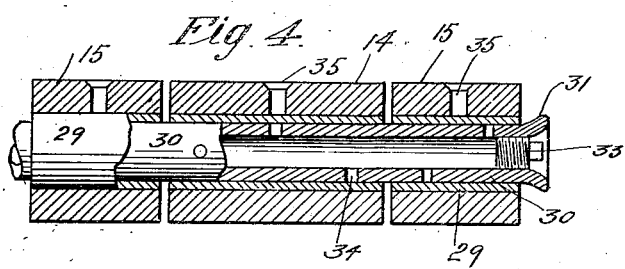
Fig. 4.
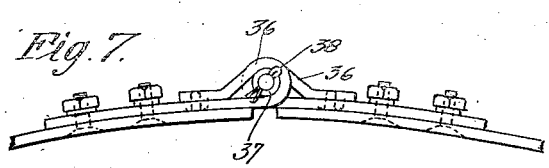
Fig. 7.
Inventor.
George G. Grace
Attorney.

Patented June 28, 1927.

1,633,939

UNITED STATES PATENT OFFICE.

GEORGE G. GRACE, OF LOS ANGELES, CALIFORNIA, ASSIGNOR OF ONE-HALF TO RICHARD E. KLINE, OF LOS ANGELES, CALIFORNIA.

BELT CONNECTER.

Application filed October 26, 1925. Serial No. 64,814.

This invention relates to hinge couplings used for detachably connecting the ends of fabric, rubber or leather belts, and it is the general object of the invention to provide a connecter of this type which may be applied with ease and will grip the belt tightly without damaging it.

While the invention is particularly applicable to belts of considerable width and thickness, it is not limited to said application. Preferably, it is made up of units, each unit comprising a leaf for each end of the belt, the number of units required for a belt of given width first being attached to the belt ends and the leaves of all the units then being hingedly connected by a common hinge pin.

I have devised novel means for attaching the connecter leaves to the belt, this means embodying bolts with relatively thin heads having conical under faces which are adapted to press the underlying portion of the belt into complementary recesses in the under face of the leaves. By this arrangement, the belt is clamped tightly between the bolt heads and leaves so belt parting strains are more effectively resisted than where the shanks of the bolts are merely passed through registering holes in the belt and leaves. Furthermore, by virtues of the recessing of the leaves, the bolts may be taken up to such an extent that the relatively thin heads are drawn inwardly until their end faces are flush with or below the pulley bearing face of the belt, and, therefore, do not interfere with the smooth engagement of the belt with the peripheral faces of the pulleys. The "crimping" of the belt into the leaf depressions give a superior frictional grip to the device and yet does not cause undesirable mutilation of the belt.

I have also provided novel means for lubricating the hinge joint, but the details of this feature may be better pointed out in the following detailed description, wherein further objects and novel features of the invention will be made apparent. Reference will be made to the accompanying drawings, in which:

Fig. 1 is a fragmentary face view of a belt connected by a device embodying my invention;

Fig. 2 is an end elevation of Fig. 1;

Fig. 3 is an enlarged section on line 3—3 of Fig. 1;

Fig. 4 is an enlarged fragmentary section on line 4—4 of Fig. 2;

Fig. 5 is a side elevation of a lock washer which may be used in connection with my device;

Fig. 6 is an end elevation of the bolt head shown in Fig. 3; and

Fig. 7 is an end elevation of a modified form of connecter.

In Fig. 1 the ends of belt 10, which may be of rubber, fabric or leather, are shown connected by the three-unit connecter 11. Since the units are of identical construction, only one need be described in detail; it being understood that the number of units used to connect the ends of the given belt depend entirely upon the width of that belt and the width of the standard unit. The leaves 12 and 13 of a given unit are made of any suitable material; for instance, they may be made of metal or leather. When made of metal they may be in the form of stampings from sheet material or, as illustrated in Figs. 1 and 2, they may be of cast iron.

Leaves 12 and 13 are identical except that, preferably, one leaf 12 has a single, centrally arranged hinge loop 14 while leaf 13 has two loops 15 which are longitudinally spaced to take loop 14 between them. Each leaf has a plurality of apertured bosses 16, and the under face 18 of the leaf is countersunk to provide conical depressions 19 which are coaxial with boss apertures 17.

Attachment bolts 20 have relatively thin heads 21, the under faces 22 of which are conical, and substantially complementary to depressions 19. Preferably, faces 22 also have ribs 23 which are adapted to be forced into the belt to hold the bolt from rotation while nut 24 is being threaded down to draw the bolt home. In order that the bolt may be positively held from rotation by the application of a tool thereto, I provide a screw-slot 25 therein, but it will be noted that said slot stops short of the peripheral edge of the head so there may be no sharp corners thereat to bite into and mutilate the belt when the bolt is fully taken up. Preferably, I provide a split lock washer 26 between boss 16 and nut 24.

In order to reduce the manufacturing cost of the device, when the leaves are of cast metal, apertures 17 may be cored out and left unmachined. However, in order that there will positively be sufficient clearance for the bolt, the apertures are cored considerably over-size, and in order that the bolt may be centered within the over-sized hole, I prefer to provide on the lower face of washer 25 an annular, depending flange 27 which is adapted to extend into aperture 17 around the bolt, it being understood that the washer is a fairly good fit for the bolt shank.

When the bolts are taken up, the belt is forced by heads 21 into depressions 19, the belt having been previously apertured at 28 to take the bolt. The illustrated "crimping" of the belt provides a relatively large area of frictional grip between the leaf and bolt, and gives a much better hold or clamp on the belt than would be the case if the belt were merely drawn against flat faces of the leaves. The parting strain of the belt is taken by the frictional clamp rather than by the bolt shank in its extension through the belt, the advantages of this feature being self-evident.

By reason of the complementary nature of the depression and bolt head, the belt may be pressed into the depression to such an extent that the outer face of the bolt head lies flush with or a little below the inner face of the belt, and, therefore, does not interfere with the smooth contact of the belt with its associated pulley (not shown.)

Preferably, though not necessarily, hinge loops 14 and 15 are provided with force-fit bushings 29, and through these bushings extend hinge pin 30. The hinge pin may be held against longitudinal displacement in any suitable manner, for instance, by being headed over or swaged as at 31. As an improved means for lubricating the hinge joint, I may provide pin 30 in the form of a tube closed at one end 32 and having at its other end a removable plug 33. The tube has in its walls apertures 34 through which lubricants introduced to the tube bore, after removing plug 33, may pass to and between the contacting peripheral faces of the tube and bushings. The lubricants may be introduced, for instance, by a pressure device. In situations where the bushings are not used, the hinge pin may be lubricated through oil holes 35 in the hinge loops.

When leather is used to form the hinge leaves, the edges of the leaves may be turned over and sewed or riveted down, as in Fig. 7, to provide hinge loops 36 which preferably, though not necessarily, have bushings 37. Whether or not the bushings are used, the hinge pin may be of raw hide, or the like, held against longitudinal displacement by means such as cotter pins 38.

It will be evident from the above that I have devised a connecter which may be applied or removed from a belt with ease and dispatch, and that this may be done without mutilation of the belt. Furthermore, the method of clamping is such that there is no likelihood of the bolts pulling through the belt when the latter is exposed to excessive parting strains.

It will be understood the drawings and description are to be considered merely as illustrative of and not restrictive on the broader claims appended hereto, for various changes in design, structure and arrangement may be made without departing from the spirit and scope of said claims.

I claim:

1. A belt connecter embodying a pair of hingedly connected leaves, said leaves having bolt holes and being countersunk to provide conical depressions on the undersides of the leaves, and attachment bolts whose shanks extend through the belt at the underside of the leaves and through said bolt holes, the bolt heads being disposed at the under side of the belt, and nuts on the bolts at the upper side of the leaves, said bolts being adapted to be taken up to press the belt into said conical depressions, said bolt shanks being of a diameter to extend through the bolt holes with appreciable clearance, and lock-washers on the bolts between the leaves and nuts, said washers having annular flanges adapted to extend into the bolt holes around the bolt shanks.

2. A belt connecter embodying a pair of hingedly connected leaves, said leaves having bolt holes, attachment bolts whose shanks extend through the belt at the underside of the leaves and through said bolt holes, the bolt heads being disposed at the under side of the belt, said bolts being adapted to be taken up to press the belt against the under side of the leaves; said bolt shanks being of a diameter to extend through the bolt holes with appreciable clearance, and washers on the bolts between the leaves and nuts, said washers having members adapted to extend into the bolt holes to engage the bolt shanks and center them in said holes.

3. A belt connecter embodying a pair of hingedly connected leaves, said leaves having bolt holes, attachment bolts whose shanks extend through the belt at one side of the leaves and through said bolt holes, nuts on the bolts and adapted to be taken up on the bolts to press the belt against said one side of the leaves, the shanks of the bolts being of a diameter to extend through the bolt holes with appreciable clearance, and washers on the shanks and having parts adapted to coact with the leaves in a manner to center the shanks in said bolt holes.

4. A belt connecter embodying a pair of hingedly connected leaves, said leaves having bolt holes, attachment bolts whose shanks extend through the belt at one side of the leaves and through said bolt holes, nuts on the bolts and adapted to be taken up on the bolts to press the belt against said one side of the leaves, the shanks of the bolts being of a diameter to extend through the bolt holes with appreciable clearance, washers on the shanks and in facial engagement with the leaves, and annular flanges on the washers adapted to extend into the bolt holes around the shanks.

In witness that I claim the foregoing I have hereunto subscribed my name this 12th day of September, 1925.

GEORGE G. GRACE.